Oct. 31, 1939.　　　G. H. AMONSEN　　　2,177,631
REVERSING MECHANISM ASSEMBLY
Filed Jan. 27, 1937　　　2 Sheets-Sheet 1

Inventor:
G. H. Amonsen.
By
Attorney.

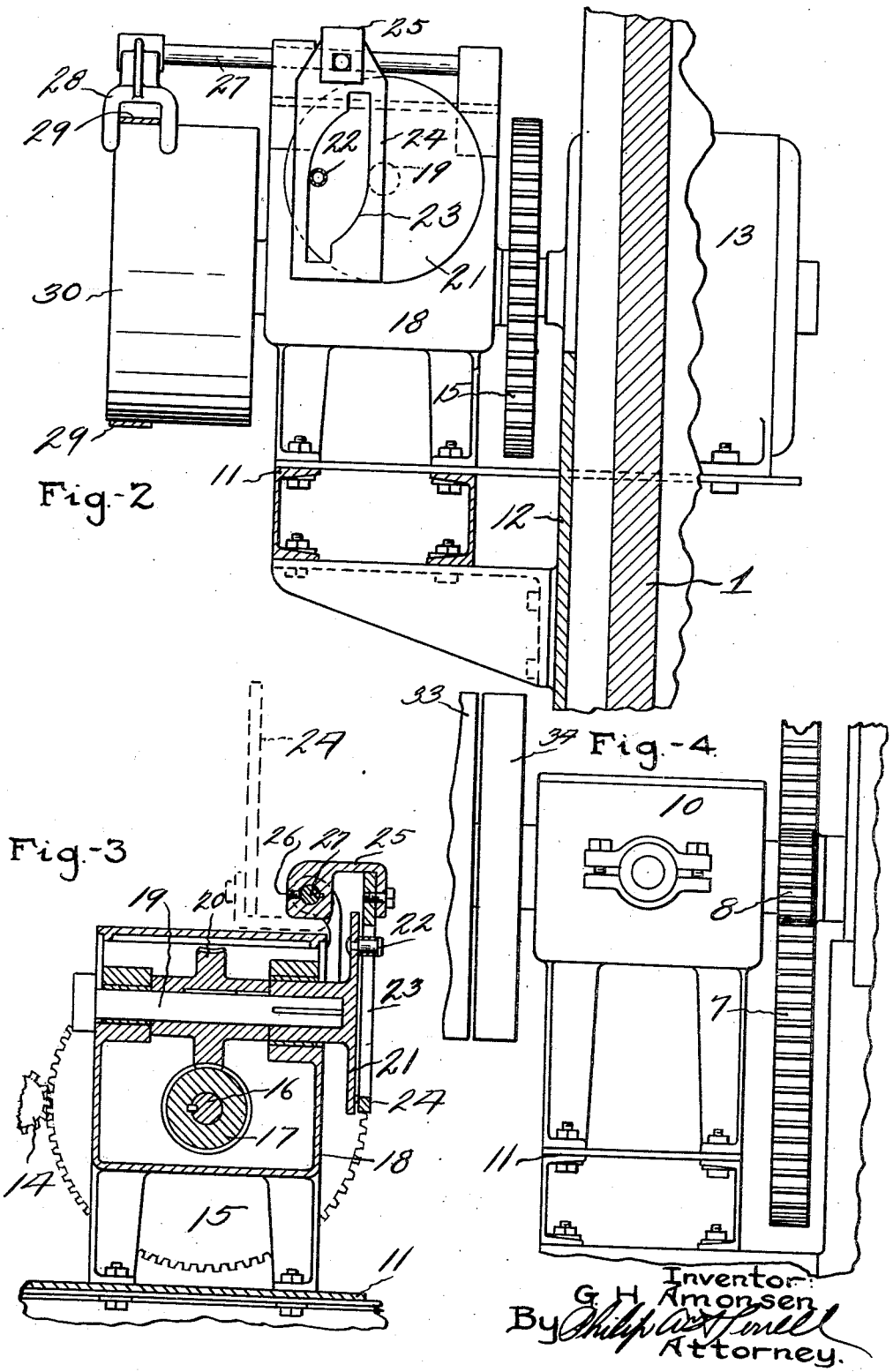

Patented Oct. 31, 1939

2,177,631

UNITED STATES PATENT OFFICE 2,177,631

REVERSING MECHANISM ASSEMBLY

George H. Amonsen, Minneapolis, Minn.

Application January 27, 1937, Serial No. 122,643

2 Claims. (Cl. 74—242)

The invention relates to reversing mechanism assemblies, particularly for use in connection with washing machines having oscillating members therein, and has for its object to provide a reversing mechanism which may be placed between adjacent machines and driven from a single source of power through a shifting belt mechanism for alternately reversing the direction of rotation of the drums within the machines for an agitating operation.

A further object is to provide means whereby the operation may be a continuous one in one direction or an intermittent rotation in opposite directions.

A further object is to provide a main drive shaft with a worm meshing with a worm gear carried by a cam disc shaft for rotating the cam disc shaft and a wrist pin in a cam yoke for oscillating the yoke and moving a belt shifter for shifting the belt from pulleys having drive gear connections with the machine cylinders for intermittently rotating the cylinders in opposite directions.

A further object is to hingedly mount the cam plate on the belt shifter rod so that said rod and the shifter fork carried thereby may be hingedly moved for rendering the belt shifting mechanism inoperative, thereby allowing a continuous operation of the cylinders in one direction, if desired, or the main drive drum to be utilized for a power take off for other machinery.

A further object is to provide the pulley driven shaft of the reversing mechanism with drive pinions at its ends and outside of the pulleys and meshing with driven gears carried by the adjacent laundry machines.

A further object is to support all of said driving and reversing mechanism on a bracket carried by the side of one of the laundry machines.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 2 is a vertical transverse sectional view through the machine taken on the line 2—2 of Figure 1.

Figure 3 is a vertical longitudinal sectional view through the belt shifting mechanism taken on line 3—3 of Figure 1.

Figure 4 is an end view of the device, taken from the position 4—4 of Figure 1.

Figure 1:
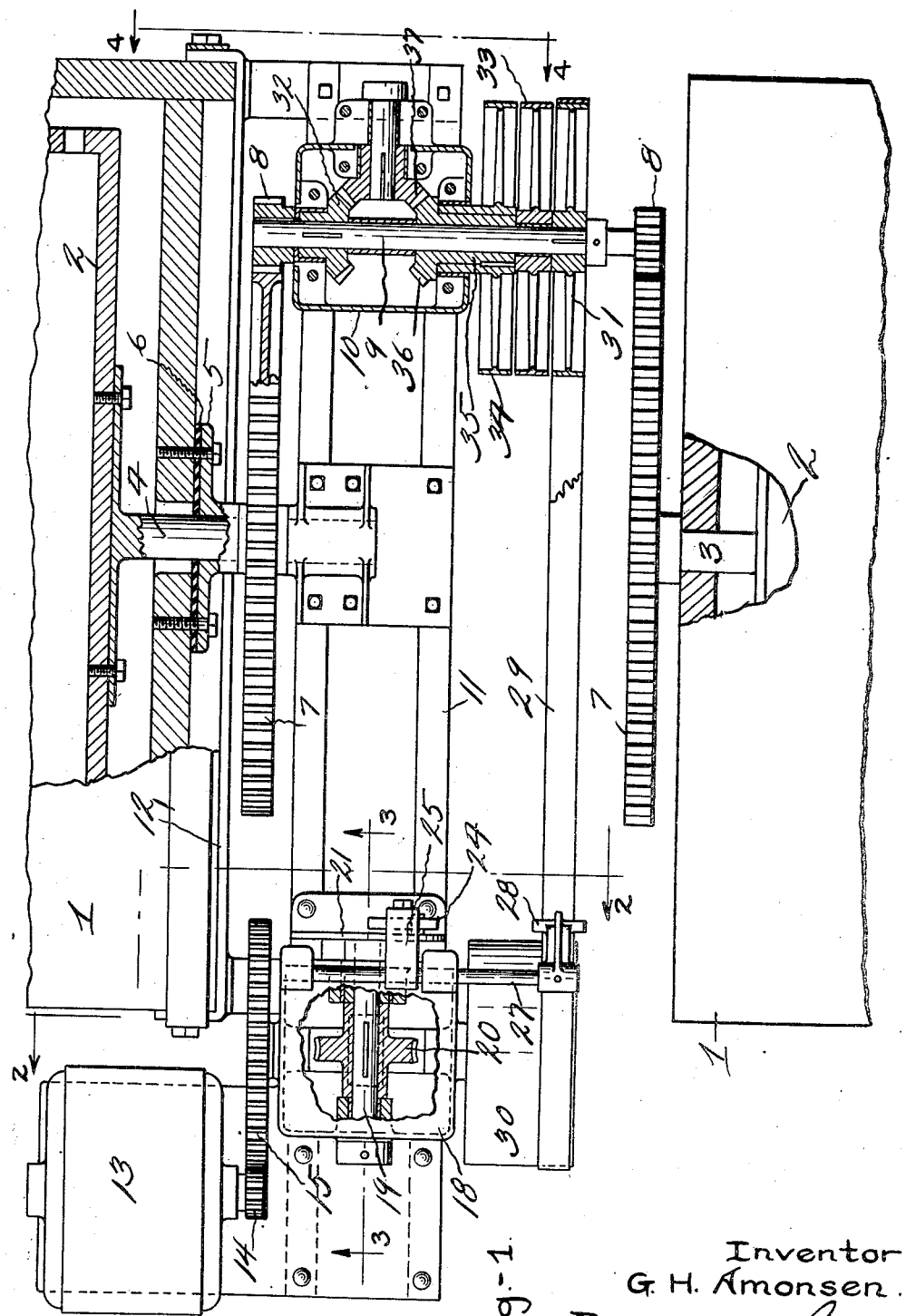
Figure 1 is a top plan view of portions of adjacent machines and of the driving and reversing mechanism therefor, parts being broken away and also in horizontal section to better show the structure.

Referring to the drawings, the numeral 1 designates the casings of adjacent machines, for instance laundry machines, and rotatably mounted therein are cylinders 2, in which articles may be placed to be washed by an agitating operation, incident to an intermittent rotation and oscillation of the cylinders through the mechanism hereinafter set forth. The cylinders 2 are provided with shafts 3 and 4 and the shaft 4 extends outwardly through a flanged sleeve 5, secured to the side of one of the casings 1, and through a yieldable packing disc 6. Both shafts 3 and 4 are provided with large driven gears 7 which are rotated by drive pinions 8 meshing therewith. The drive pinions 8 are mounted on the reversing gear shaft 9, which extends through a casing 10, and which shaft 9 is adapted to be rotated in opposite directions for imparting opposite rotation or reverse rotation to the cylinders during the operation of the mechanism.

Secured to one of the casings 1 is a horizontally disposed shelf 11 supporting the entire mechanism. The shelf 11 is secured to the casing 1 by means of straps 12, one of which encircles the casing 1, and the other connects opposite sides thereof. Mounted on the shelf 11, preferably to the rear of the machine casing 1 is the drive motor 13 having a drive pinion 14, which meshes with a large gear 15 carried by the inner end of the worm shaft 16, on which the worm 17 is mounted. The worm shaft rotates constantly in one direction, and the reversing operation takes effect through a belt shifting operation. Worm shaft 16 and worm 17 are disposed within a casing 18 mounted on the shelf 11 and extending through said casing 18 at a right angle to the shaft 16 is a cam disc carrying shaft 19 having a worm 20 meshing with worm 17.

Shaft 19 terminates in a disc 21 having a wrist pin 22 therein, which wrist pin is preferably of the roller type, as shown in Figure 3, and extends through a vertically elongated cam slot 23, which is proportioned whereby as the wrist pin 22 is rotated, the cam slot plate 24 will be oscillated inwardly and outwardly in relation to the casing 1 of the washing machine for belt shifting operations. It is to be understood that the gears 14 and 15 will be of a ration whereby the belt shifting operations may be completed. By referring to Figure 2 it will be seen that the plate 24 is in its outer position and that the wrist pin 22, upon its further movement, will not actuate or move the plate in the opposite direction until it engages the opposite side of the cam slot 23, therefore it will be seen that the mechanism hereinafter set forth will have an intermittent operation in opposite directions for rotating the drums continuously in one direction for limited periods. The plate 24 has secured to the upper end thereof an angularly shaped bracket 25, which is secured by means of a set screw 26 on the belt shifter shaft 27, therefore it will be seen that the shaft 27 will be axially moved inwardly and outwardly during the reciprocation of the plate 24. Shaft 27, at its outer end, is provided with a downwardly extending belt fork 28, which arches the drive belt 29, consequently the drive belt 29 will be shifted inwardly and outwardly on the large drive pulley 30. When it is desired to operate the machine continuously in one direction, the plate 24 may be pivoted upwardly with the belt shifter shaft 27 and fork 28 to the dotted line position shown in Figure 3, and this will render shifting mechanism inoperative, and at the same time the casing 18 will act as a support for the plate 24 in its inoperative position.

Keyed to the reversing gear shaft 9 is a driven pulley 31, over which drive belt 29 extends. Reverse gear shaft 9 has keyed thereto a bevelled gear 32, therefore it will be seen that when the belt 29 is on the pulley 31, there will be a driving of the cylinder 2 through pulley 31, shaft 9, drive gear 8, large gear 7 and shaft 4. When the belt is shifted inwardly on the drive pulley 30, it will pass over the idle pulley 33 and onto the reverse drive pulley 34. The reverse drive pulley 34 is keyed on the sleeve 35, which is rotatably mounted on the shaft 9 and is provided with a bevelled gear 36, which meshes with an idle bevel gear 37, which in turn meshes with the bevel gear 32 carried by the shaft 9. As the reverse pulley 34 is rotated on the shaft 9, a reverse rotation is imparted to the shaft 9 through gears 36, 37, and 32, consequently the cylinder 2 is reversely rotated. This operation continues during the intermittent reciprocation of the cam slot plate 24, hence a reverse agitating operation is obtained. The shaft 3 of the adjacent machine is driven through the drive pinion 8 carried by the reverse shaft 9 and its large drive gear 7, hence it will be seen that the single mechanism may be placed between adjacent machines and utilized for operating both of them. If desired, the belt 29 could be removed from the drive pulley 30 and the pulley utilized for a power take off for other machinery.

From the above it will be seen that a reversing mechanism is provided, particularly for washing machines, wherein the cylinders within the machines may be intermittently rotated in opposite directions and that the same mechanism may be utilized for driving adjacent machines. It will also be seen that continuous rotation of the cylinders in one direction may be obtained by pivoting the same slot plate out of the path of the wrist pin and the mechanism is simple in construction and compact.

The invention having been set forth what is claimed as new and useful is:

1. A drive mechanism for a laundry machine having a cylinder therein, mechanism for driving said cylinder in opposite directions intermittently, said mechanism comprising a supporting shelf carried by the machine, a drive gear mechanism mounted on said shelf, a reversing gear mechanism mounted on said shelf spaced from the drive gear mechanism, a driven gear carried by the machine and having a gear connection with the reverse gear, a plurality of pulleys carried by the reverse mechanism, axially thereof, a drive pulley carried by the drive mechanism, a belt extending over the drive pulley and one of the pulleys of the reversing mechanism, belt shifter means carried by and controlled by the drive mechanism and cooperating with the belt connection for shifting the belt connection from one pulley to the other of the reversing mechanism whereby a reverse rotation is imparted to the reverse mechanism, said belt shifter means comprising an axially movable rockably mounted shaft, a cam carried by said shaft and having a cam slot extending through the same, a rotatable wrist pin controlled by the drive mechanism and extending through the cam plate and received therein upon movement thereof and cooperating therewith for intermittently moving the plate in opposite directions for a belt shifting operation.

2. A drive mechanism for a laundry machine having a cylinder therein, mechanism for driving said cylinder in opposite directions intermittently, said mechanism comprising a supporting shelf carried by the machine, a drive gear mechanism mounted on said shelf, a reversing gear mechanism mounted on said shelf spaced from the drive gear mechanism, a driven gear carried by the machine and having a gear connection with the reverse gear, a plurality of pulleys carried by the reverse mechanism axially thereof, a drive pulley carried by the drive mechanism, a belt extending over the drive pulley and one of the pulleys of the reverse mechanism, belt shifter means carried by and controlled by the drive mechanism and cooperating with the belt connection for shifting the belt connection from one pulley to the other of the reverse mechanism whereby a reverse rotation is imparted to the reverse mechanism, a drive worm carried by the drive mechanism, a wrist pin carrying shaft at a right angle to the worm, a worm carried by said wrist pin shaft and with which the worm cooperates, a wrist pin carried by the wrist pin shaft, a belt shifter shaft rockably and axially movable above the wrist pin shaft, a cam slot member carried by the belt shifter shaft and extending outwardly and downwardly over the wrist pin and terminating in a portion having a cam slot through which the wrist pin extends and is received upon hinged movement of the cam slot member, a belt shifter fork carried by the shaft, said cam slot member and belt shifter fork being hingedly movable to inoperative position for a rotation of the shaft.

GEORGE H. AMONSEN.